United States Patent [19]
Holler et al.

[11] Patent Number: 5,878,261
[45] Date of Patent: Mar. 2, 1999

[54] METHOD FOR RESTRUCTURING CODE TO REDUCE PROCEDURE CALL OVERHEAD

[75] Inventors: Anne M. Holler, San Jose; Manuel E. Benitez, Sunnyvale, both of Calif.

[73] Assignee: Hewlett-Packard Company, Palo Alto, Calif.

[21] Appl. No.: 648,468

[22] Filed: May 15, 1996

[51] Int. Cl.$^6$ ........................................................... G06F 9/45
[52] U.S. Cl. ............................................ 395/709; 395/705
[58] Field of Search .................................... 395/701, 702, 395/704, 705, 708, 709

[56] References Cited

U.S. PATENT DOCUMENTS

| | | | |
|---|---|---|---|
| 4,924,408 | 5/1990 | Highland ................................... | 706/60 |
| 5,457,799 | 10/1995 | Srivastava ................................ | 395/709 |
| 5,701,489 | 12/1997 | Bates et al. ............................... | 395/705 |
| 5,734,908 | 3/1998 | Chen et al. ................................ | 395/709 |

OTHER PUBLICATIONS

"Minimizing Register Usage Penalty at Procedure Calls" by Fred C. Chow, Proceedings of the SIGPLAN '88 Conference on Programming Language Design and Implementation, Atlanta, Georgia, Jun. 22–24, 1988, pp. 85–94.

*Primary Examiner*—Parshotam S. Lall
*Assistant Examiner*—Viet Vu

[57] ABSTRACT

Software procedure call overhead, i.e. the memory references or other steps taken to save and restore callee save register values during execution of a called procedure, are reduced by restructuring the procedure code during optimization so that unnecessary or redundant save and restore operations are less likely. The procedure exit block is split into first and second exit blocks, with control flow from the first to the second exit block, and return to the calling procedure from the latter. "Shortcut" control paths are directed to the second exit block, while the new, first exit block is used to post-dominate sections of the code not otherwise amenable to shrink-wrapping techniques. Save and restore operations are wrapped around the non-shortcut code and the new exit block. During execution of the procedure as modified, shortcut paths to the second exit block effectively bypass the first exit block, thereby reducing overhead associated with callee save registers referenced in the non-shortcut path. This methodology extends known shrink-wrapping concepts to further improve performance of computer programs.

14 Claims, 5 Drawing Sheets

METHOD FOR RESTRUCTURING CODE TO REDUCE PROCEDURE CALL OVERHEAD

FIELD OF THE INVENTION

The present invention relates to operation of digital computers and, more specifically, is directed to improvements in compiler methodology for reducing software procedure call overhead attributable to hardware callee register save and restore operations.

BACKGROUND OF THE INVENTION von Neumann architecture digital computers have a register set for holding various values during operation. The size of the register set may vary. All von Neumann machines have at least a program counter (PC). Generally, there are also several registers for holding operands and results ("operational registers"). RISC (reduced instruction set computer) machines generally have only register-to-register instructions (as distinguished from instructions that directly access memory) except for LOAD and STORE instructions, which read from memory or write to memory but do not operate on the data. They tend to have larger register sets, numbering for example 32 or more registers. Registers are used for holding intermediate results, address indexing, and passing data (parameters) between calling and called procedures. Some processors have floating-point registers in addition to general registers. CISC architectures may have evaluation stacks, thus providing for 0-address operations in which the operands are implicit. RISC architectures usually do not have evaluation stacks. The compiler normally keeps a stack in memory on RISC architectures, primarily for parameter passing and register spills rather than for computation. In most architectures, the overhead of saving and restoring registers on procedure calls is burdensome; it can account for 5% to 40% of main memory references.

More specifically, many computer system's hardware registers are, by convention, partitioned into two sets: (1) callee save registers; and (2) caller save registers. When callee save registers are used by a callee procedure, that procedure is responsible for ensuring that those registers' values appear unchanged to the calling procedure. In other words, the callee procedure is free to use the callee save registers, provided they are restored to their original state before returning from the callee procedure. This may be accomplished in a straightforward manner by saving and restoring all of the callee save registers' values at the callee procedure entry and exit points, respectively. If the callee code referencing any of those registers is conditionally executed, however, that code may not be exercised on certain invocations of the callee procedure. For those invocations, the associated save and restore operations are redundant, and hence represent unnecessary overhead and a potential performance penalty.

To illustrate, FIG. 1 shows a block of lines of code, i.e., instructions in a selected computer programming language. The program 10 includes an instruction CALL A that invokes a subroutine A. Subroutine A is a sequence of lines of codes indicated generally by bracket 20. In this system, for purposes of illustration, we will assume a total of 32 hardware registers, of which registers R3, R4, R5, R10, R11 and R12 are designated as callee save registers. The compiler determines from examining the code in subroutine A that of the callee save registers, registers R3, R4 and R5 are potentially referenced in subroutine A. We say they are "potentially referenced" because references to each of registers R3, R4 and R5 appear somewhere in subroutine A, but it cannot be determined in advance of execution whether or not each of those registers will actually be modified because one or more of the register references may occur in a conditional section of code, such as code block 24 in FIG. 1, which will not be executed under certain circumstances. Since callee save register R3, for example, is set within conditional block 24, it would not be modified unless code block 24 actually executes.

Nonetheless, to ensure that these registers are properly saved, subroutine A saves each of them, as indicated at reference 30, at the beginning of the subroutine. Conversely, subroutine A restores each of registers 3, 4 and 5 to their original states as indicated at reference 32. This series of restores is the last operation before subroutine A returns control to the caller procedure. It should be noted that each individual register save requires a memory access operation, as does each individual register restore. Accordingly, in the example of subroutine A, a total of 6 memory access operations are executed to save and restore the callee save registers even though none of them may actually be modified during execution of subroutine A.

To reduce the likelihood of executing save and restore operations unnecessarily, Fred Chow describes a technique called "shrink-wrapping" which uses data flow information to guide the placement of a registers' save and restore operations. Referring to FIG. 2, subroutine B potentially references callee save register R3. Notice, however, that register R3 is used only within a conditional branch delineated by the IF and ENDIF statements. If the IF statement condition is not met, the block of code in which R3 is used will not be executed. Hence there would be no reason to save that register. According to Chow's procedure, the save and restore operations are moved closer to the actual use of the registers. In FIG. 2, the SAVE R3 operation immediately preceeds the SET R3 statement. ("SET" generically refers to any statement or operation that potentially modifies the value stored in R3.) The restore operation RESTORE R3 appears a little later, but prior to the ENDIF statement. Thus the save and restore operations have been "shrink-wrapped" more tightly around the use of register R3. Since the save and restore operations are now contained within the conditional branch of subroutine B, there will be no wasted cycles to save and restore R3 if this branch is not executed. On the other hand, shrink-wrapping within a loop must be avoided, as a penalty would be paid to save and restore every time the loop is executed. This shrink-wrap procedure is described in considerable detail in *"Minimizing Register Usage Penalty at Procedure Calls"* by Fred C. Chow, Proceedings of the SIGPLAN '88 Conference on Programming Language Design and Implementation, Atlanta, Ga., Jun. 22–24, 1988, pp. 85–94.

The procedure described by Chow, hereinafter referred to as "basic shrink-wrapping" is not always successful, however. Often, there are code structures in which advantageous save and restore points cannot be found. For example, referring briefly to FIG. 3, if a register is set in code block B and used in code block D, one might attempt to save the register at the beginning of block B and restore at the end of block D. That strategy will fail, however, because if control flows through block C (instead of D), the register will be set but not restored. In such cases, the compiler has no choice but to save and restore callee save registers at the entry and exit points of the called procedures, respectively, as described with reference to FIG. 1. Basic shrink wrapping fails. The need remains, therefore, to reduce procedure call overhead in cases where known techniques fail or leave room for further improvement.

SUMMARY OF THE INVENTION

In view of the foregoing background, a general object of the present invention is to increase performance of a computer program by decreasing the number of redundant save and restore operations it executes.

It is another object of the invention to provide an improved strategy for saving and restoring callee save registers so as to reduce called procedure overhead.

A further object of the invention is to provide a split-exit method of restructuring a computer program so that it executes with lower procedure call overhead than if it had not been so restructured. In a preferred embodiment, the present invention includes methods for implementation in a compiler "back-end" or optimizer for restructuring computer programming code to reduce called procedure overhead.

According to one aspect of the invention, "short-cuts" are first identified in a procedure's control flow graph. A shortcut is characterized as a path that splits off the main thread of the procedure's control flow immediately after the procedure's entry point, or immediately after the split of another short-cut. Shortcut paths are adequately optimized using the basic shrink wrapping method. If any short-cuts are found, the registers used on the short-cut paths, as well as registers already shrink-wrapped as in prior art, are removed from further consideration. The remaining referenced callee save register values are maintained by a new split-exit shrink-wrapping technique.

This technique includes restructuring the code as follows. If any of the callee save registers for which the attempted basic shrink-wrapping failed are not referenced along any of the shortcut control flow paths, we designate such registers as "split-exit registers". Then the new method calls for splitting the original exit block by inserting a "first exit block" into the procedure, and designating the original exit block as a "second exit block". Accordingly, all the shortcut control flow paths go to the second exit block and the procedure control flow returns from the second exit block. We route a return path from the non-shortcut path to the first exit block, so that the first exit block post-dominates the non-shortcut path. We save the split-exit register values at the beginning of the non-shortcut path; and restore the split-exit register values in the first exit block. Control flow is routed from the first exit block to the second exit block. As a result, during execution of the procedure as modified, shortcut paths to the second exit block effectively bypass the first exit block, thereby reducing overhead associated with the split-exit registers.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

A "basic block" of code is known to consist of a series of instructions that has one entry point and one exit point, or one decision point for exiting the block. "Interval blocks" correspond to somewhat higher level structures such as if-then and loop control structures. Interval blocks generally include basic blocks within them. Thus, the control flow graphs of FIGS. 3 and 4, described below, comprise interval blocks of code.

We use the terms dominate and post-dominate to refer to blocks of code or to more specific locations in a procedure, as follows. A given block of code is dominated by a first location if that first location must be traversed (executed) prior to execution of the block of code. Conversely, the given block of code is post-dominated a second location if that second location necessarily will be traversed (executed) following execution of the given block of code. Thus, saving a register's value at a dominate location and restoring the same register at a post-dominate location is sufficient to ensure that the register's value appears unchanged to the caller procedure.

Figure 1:
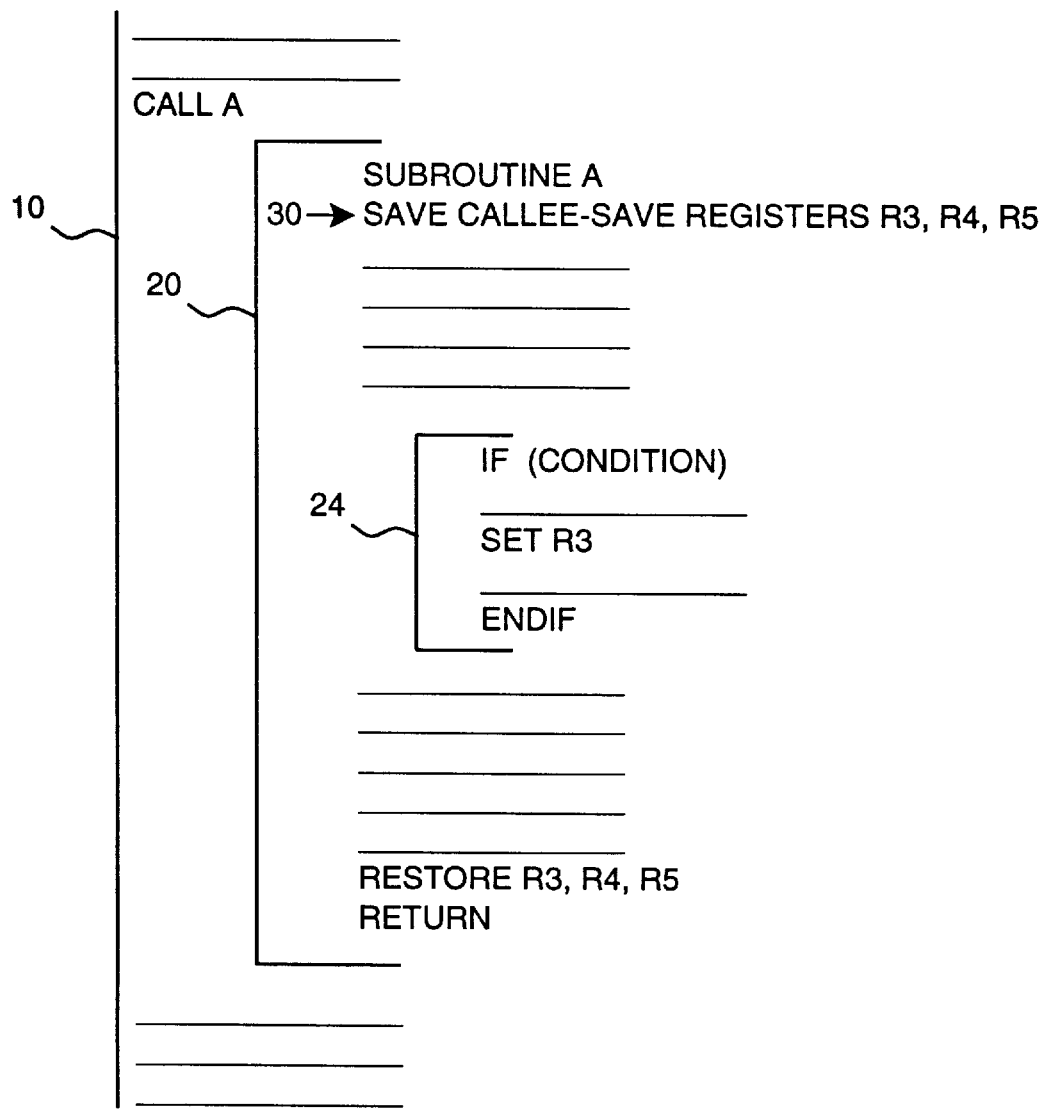
FIG. 1 illustrates conventional callee register save and restore procedures in a subroutine.
Figure 2:
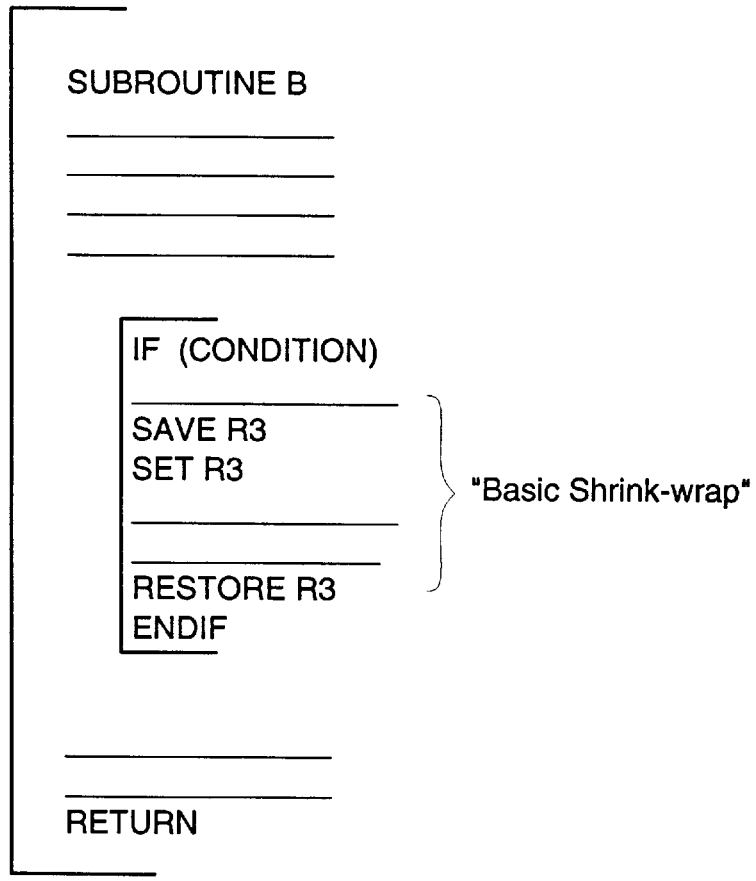
FIG. 2 illustrates basic shrink-wrap callee register save and restore procedures in a subroutine.
Figure 3:
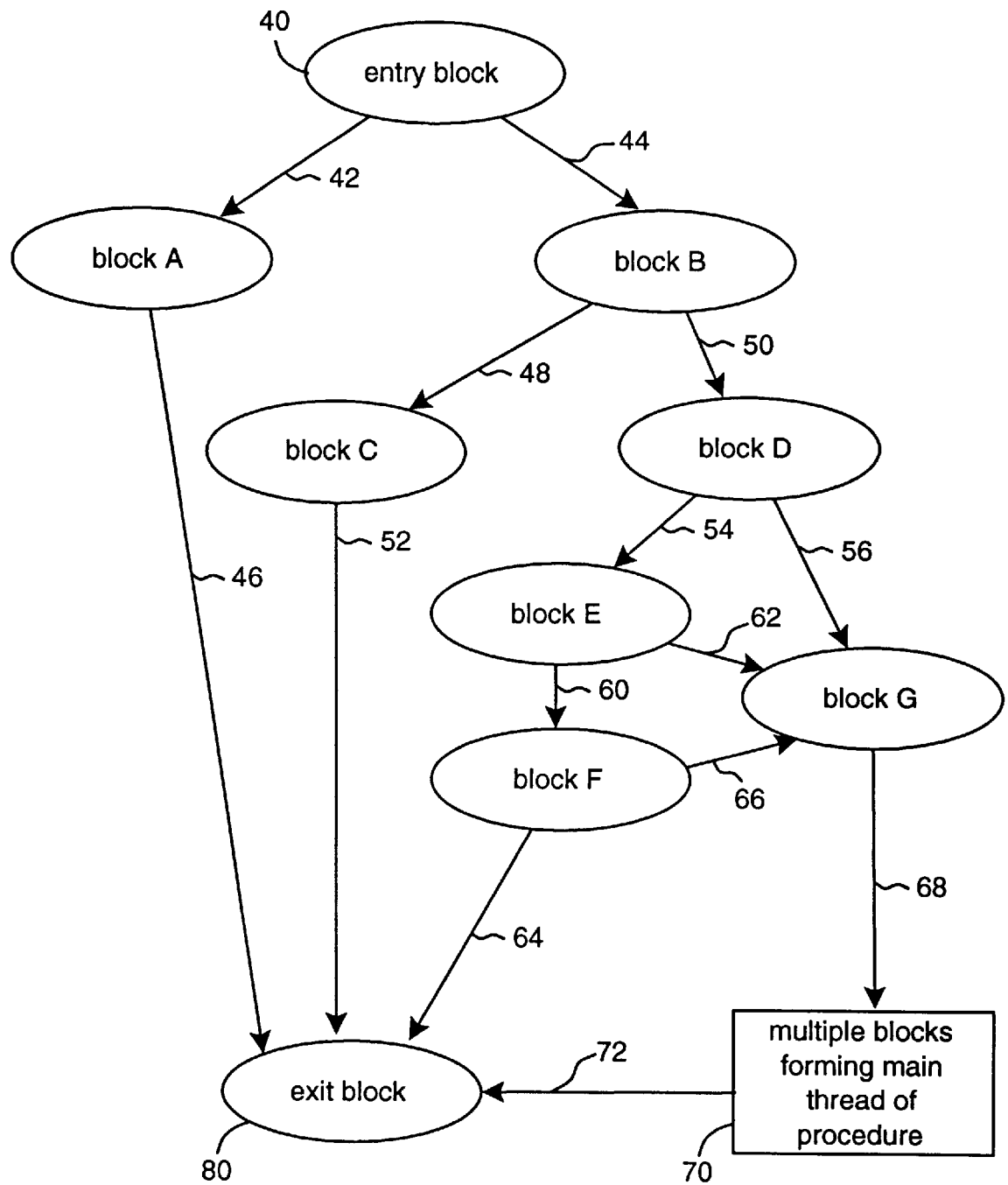
FIG. 3 is a procedure control flow graph that includes short-cut paths to a procedure exit block.
Figure 4:
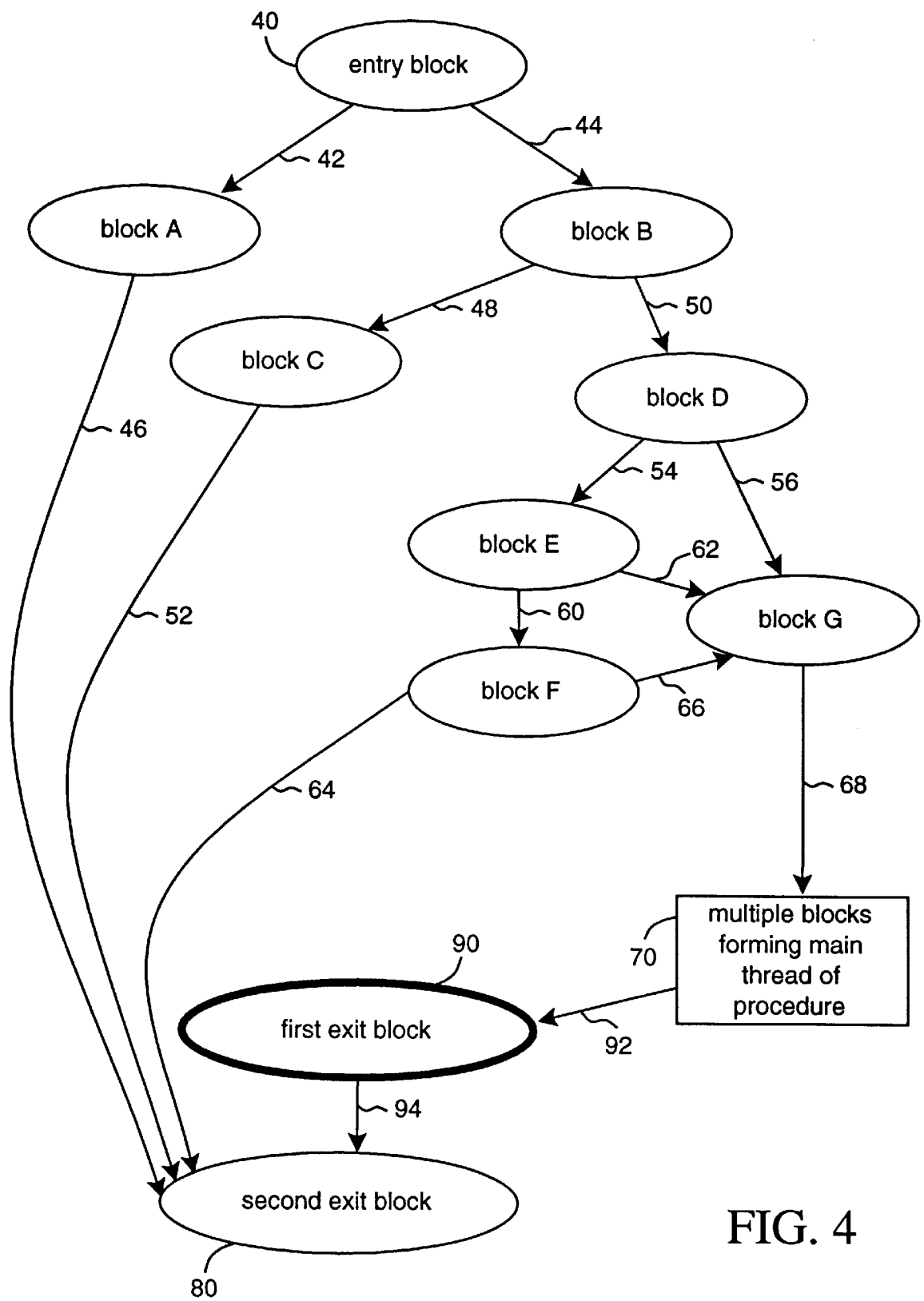
FIG. 4 is a procedure control flow graph illustrating a split-exit methodology of the present invention for restructuring the code to reduce procedure call overhead.

To illustrate, FIG. 3 is a procedure control flow graph of a program consisting of numerous blocks of code, beginning with an entry block 40 and ending with an exit block 80. Each block of code is represented by an oval inside of which the block is labeled. Control flow of the program is indicated by paths interconnecting the various blocks of code, each path having an arrowhead indicating the direction of control flow. For example, the entry block 40 has a first path 42 to block A, and an alternative second path 44 to block B. This topology implies that one or more decisions are made within the entry block 40 that result in a decision as to whether program execution will jump to block A or to block B. From block A, execution proceeds via path 46 directly to the exit block 70. Thus, if execution enters block A, it necessarily will enter the exit block directly from block A. So block A is dominated by the entry block 40 and post-dominated by the exit block 80. Similarly, it may be observed that block C is dominated by block B and post-dominated by the exit block.

Conventionally, the registers potentially referenced within say, block A, are saved and restored within block A as described above. The basic shrink-wrap methods described by Chow may improve performance by placing the save and restore operations closer to the register use within block A. However, the basic method requires finding a unique dominator and a unique post-dominator for each live range (or "lifetime"—i.e. set and use) of a callee save register. It cannot do so for a register whose lifetime spans code block E and F, for example, where no unique post-dominant location is apparent, other than the exit block.

The present invention provides a new method for restructuring the procedure to further reduce overhead. Referring again to FIG. 3, we earlier defined a "shortcut path" as one that splits off the main thread of the procedure's control flow immediately after the procedure's entry point (or immediately after the split for another shortcut as explained later), and proceeds to the exit block without any intervening decision branches. For example, block A lies on a shortcut path because its entry path 42 splits off the main thread of the procedure's control flow immediately after the entry block 40. Also, there are no loops or additional decisions before control flows from block A via path 46 to the exit block 40. Thus, block A is said to lie on a shortcut path. Put another way, if there is a decision at the end of the entry block and one of the paths of that decision goes immediately to the exit block, that path forms a shortcut.

Second, to identify additional shortcuts we consider the path that was not a shortcut as if that path was the entry block. For example, path 44 leads to block B. If block B is considered an entry block, it can be observed that block C now fits the definition of a shortcut path, as it lies on a decision at the end of the entry block (here block B), that is split off of the main thread of the procedure, and goes immediately to the exit block 80 (via path 52). So block C qualifies as a shortcut path given this broader definition. In other words, the definition of a shortcut is applied recursively to form a list of shortcut paths. Block d thus is considered next as the entry block of a potential shortcut. However, neither of the paths 54, 56 that flow from block d goes immediately to the exit block.

As for the shortcut blocks, block A and block C, each of them has a unique dominator and post-dominator block and conventional techniques for saving and restoring registers referenced within those blocks of code can be applied. The conventional techniques, as noted above, include saving and restoring referenced registers at the beginning and the end of these code blocks, respectively, or more tightly "shrink-wrapping" save and restore operations around individual callee save register lifetimes within block A and/or block C. The callee save registers that are used in a shortcut path thus are saved and restored as appropriate and need not be considered further.

Returning to block D, it appears to dominate the remainder of the code—blocks E, F, G and 70, so it could be used to save callee registers referenced in the remaining codes. However, that provides little advantage in reducing overhead. Neither of the descendants of block D, as noted above, proceeds immediately to the exit block. However, control flows from block D via path 54 to block E, and from there either via path 62 to block G or via path 60 to block F. At block F, control flows either via path 64 to the exit block 80 or via path 66 back to block G. It has thus been determined that although there are two possible paths from block D, path 54 and path 56, both paths ultimately lead either to the exit block 80 or to block G. We expand our definition of a shortcut path to include a "relative shortcut"—here formed by block D, block E, block F and the exit block 80. A relative shortcut path goes immediately to the exit block, or to another (single) block G.

Next, we "split" the exit block 80 so as to form first and second exit blocks, a first exit block 90 and a second exit block 80, the latter corresponding to the original exit block. The "new" block 90 is first among the two in order of execution as control flows from exit block 90 via path 94 to the second exit block 80. All shortcut paths are routed to the second exit block 80. By "routed" we mean providing appropriate JUMP or BRANCH type commands at the ends of those blocks directing procedure control flow to the second exit block. In this way, execution that takes one of the shortcut paths never reaches the first exit block.

The first exit block, on the other hand, post-dominates all of the non-shortcut code. The first non-shortcut block G dominates the non-shortcut code. The non-shortcut exit path 92 is routed to the first exit block 90. Save commands are placed at the beginning of block G for any callee save registers not used in a shortcut path. Corresponding restore commands for the non-shortcut code is placed at the end of the first exit block 90. Thereafter, control flows from the first exit block to the second exit block, to ensure execution of other restore commands complementary to save commands that appear at the entry block 40. From the second exit block 80, control returns to the caller procedure. Thus, the invention effectively "shrink-wraps" blocks of code where the prior art failed because such blocks lacked unique dominate and post-dominate locations. The new split-exit methodology solves that problem.

Figure 5:
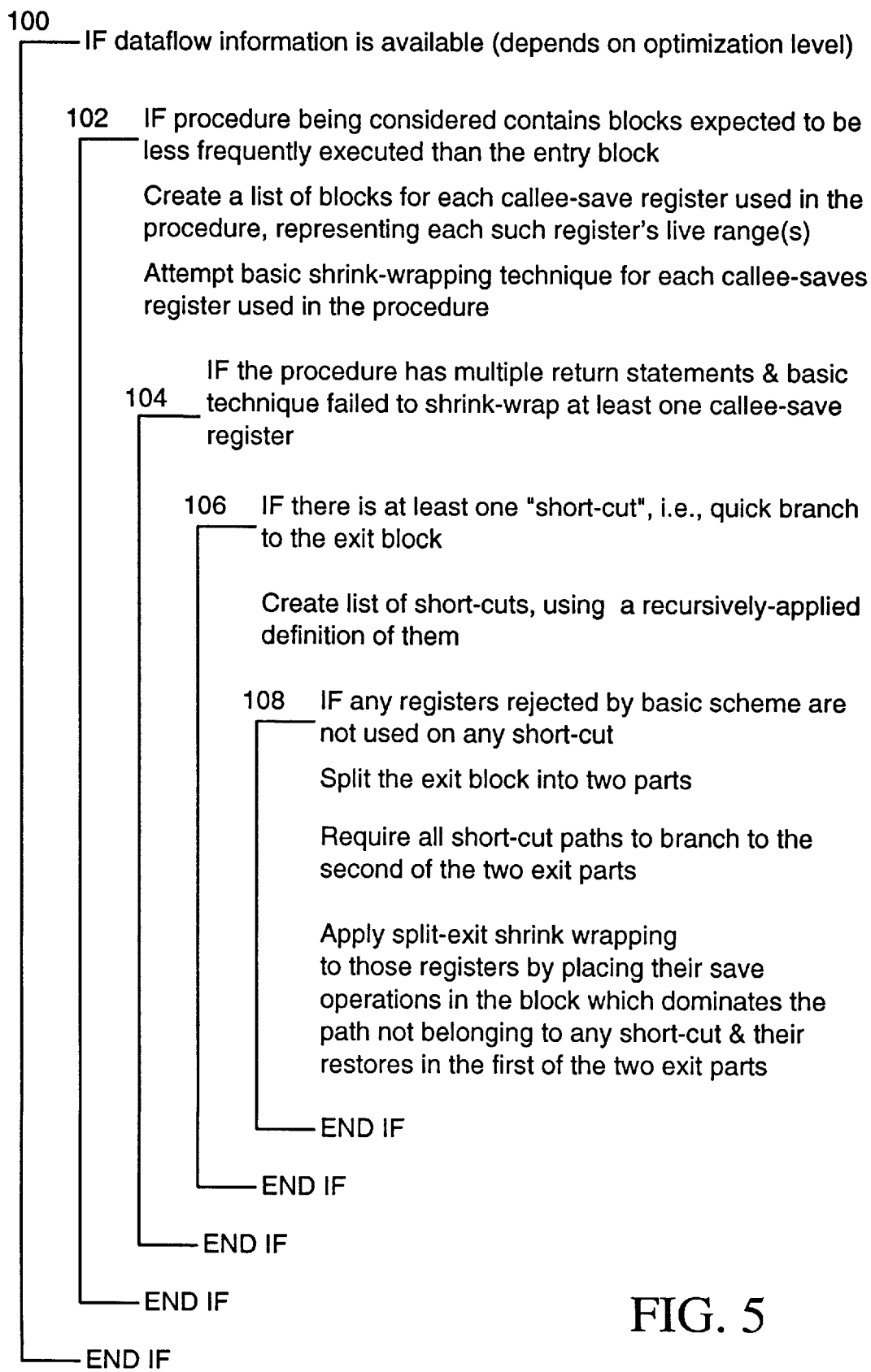
FIG. 5 is a pseudo-code listing illustrating the process of the present invention.

FIG. 5 is a pseudo-code listing that summarizes the methodology of the present invention at a high level. Referring to FIG. 5, the first step 100 is to determine if data flow information is available. This kind of information is generally available in a compiler optimization environment. Compiler technologies are well known for building data structures that define variables and their usage, and assignment of hardware registers. Implementation of the present invention requires at least the availability of basic data flow information including lists of basic code blocks.

Next, step 102 determines whether the procedure being considered contains any blocks that are expected to be less frequently executed than the entry block. Techniques are known for making this determination in various ways. If the program has been run, "profile" data may have been collected during execution that includes information on block usage. Alternatively, the compiler makes an educated "guess" about block usage. For example, any block that lies in a conditional execution path and not within a loop can be assumed to be executed less frequently than the entry block. If the procedure contains such blocks, the next step is to create a list of related blocks for each callee-save register used in the procedure. This list identifies the blocks corresponding to each such registers' live range(s). To illustrate, assume that register 5 is a callee save register and that it is set in block B and used in block D (FIG. 3). Then the list of blocks for register 5 would include B and D, associated together as a single lifetime. Register 5 might also be both set and used in block A, in which case block A would be added to the list as a distinct lifetime of register 5. Referring once again to the pseudo-code of FIG. 5, the basic shrink-wrapping technique described earlier is attempted for each of the callee-save registers used in the procedure. For the reasons explained earlier, the basic shrink-wrapping technique will be useful for the lifetime of register 5, for example, that is confined to block C, but it will fail in the attempt to shrink-wrap the block B-block D lifetime.

Condition 104 in FIG. 5 next determines whether the procedure has multiple return statements. In FIG. 3, for example, each of the paths to the exit block, i.e., paths 46, 52, 64 and 72, correspond to return statements. If the procedure has multiple return statements and the basic technique failed to shrink-wrap at least one callee-save register, the new split-exit technique can be used profitably.

Step 106 determines whether there are any shortcut paths, as defined above, and if so, creates a list of them. Next, step 108 determines if any of the registers rejected by the basic shrink-wrapping scheme are not used on any shortcut paths. It may be observed that the foregoing steps serve to filter out procedures where shrink-wrapping is unnecessary, and in procedures where shrink-wrapping is useful, to filter out portions of the code where conventional shrink-wrapping (the basic method) is applicable.

The new process continues by splitting the exit block into two parts and restructuring the code as described above with reference to FIG. 4. All shortcut paths are required to branch to the second of the two exit blocks, and split-exit shrink-wrapping is applied to the applicable registers by placing their save operations at the beginning of the block that dominates the non-shortcut path, and the corresponding restore operations in the new, first exit block, as described above.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A computerized method for restructuring a computer program procedure in a compiler or optimizer to reduce procedure call overhead, the procedure initially consisting of a plurality of code blocks stored in a computer memory, including a single entry block and a single original exit block, and the method comprising the steps of:

designating a predetermined set of hardware registers as callee save registers;

identifying callee save registers that are potentially referenced in the procedure;

identifying shortcut control flow paths in the procedure;

designating as a non-shortcut path a first path in execution order that is not within any of the said shortcut control flow paths;

if any of the callee save registers are not referenced along any of the shortcut control flow paths, designating such registers as split-exit registers;

splitting the original exit block by inserting a first exit block into the procedure and designating the original exit block as a second exit block, so that the procedure control flow returns from the second exit block and the shortcut control flow paths go to the second exit block;

routing a return from the non-shortcut path to the first exit block, so that the first exit block post-dominates the non-shortcut path;

routing control flow from the first exit block to the second exit block;

providing for saving of the split-exit register values at the beginning of the non-shortcut path; and providing for restoring the split-exit register values in the first exit block;

whereby, during execution of the procedure as modified, shortcut paths to the second exit block effectively bypass the first exit block, thereby reducing overhead associated with the split-exit registers.

2. A method according to claim 1 further comprising:

attempting basic shrink-wrapping as to each of the identified callee save registers;

identifying callee save registers for which the attempted basic shrink-wrapping failed; and designating as split-exit registers only those callee save registers for which the attempted basic shrink-wrapping failed and that are not referenced along any of the shortcut control flow paths.

3. A method according to claim 1 wherein said identifying shortcut paths includes applying a recursive definition of a shortcut path, starting from the entry block.

4. A method according to claim 1 wherein said identifying shortcut control flow paths includes identifying a control flow path that splits off of a main thread of the procedure's control flow immediately after the procedure's entry block and proceeds to the exit block without any intervening decision branches.

5. A method according to claim 1 wherein said identifying shortcut control flow paths includes identifying a relative shortcut path defined as a control flow path that proceeds immediately to the exit block or to one other unique block of code.

6. A method for restructuring a computer program procedure to reduce procedure call overhead during execution of the procedure, comprising the steps of:

designating a predetermined set of hardware registers as callee save registers;

identifying a set of discrete blocks of code together forming the procedure;

identifying an entry block of code and an original exit block of code among the discrete blocks of code;

identifying a set of control flow paths among the blocks of code;

selecting and identifying as a main thread of the procedure a subset of the blocks of code together with the control flow paths that interconnect the selected subset of the blocks of code;

detecting and designating as a shortcut path each control flow path that splits off of the main thread immediately after the entry block and goes immediately to the exit block;

splitting the original exit block by inserting a first exit block into the procedure and designating the original exit block as a second exit block, so that the procedure control flow returns from the second exit block and the shortcut control flow paths go to the second exit block;

identifying a first non-shortcut path in execution order; and in the first block on the non-shortcut path, saving register values for callee save registers referenced in code blocks located along the non-shortcut path;

in the new exit block, restoring the register values saved in the first non-shortcut block; and routing control flow from the new exit block to the second exit block;

whereby, during execution of the procedure as modified, shortcut paths to the second exit block effectively bypass the first exit block, thereby reducing overhead associated with the split-exit registers.

7. A method for restructuring a computer program according to claim 6 wherein said detecting and designating as a shortcut path includes applying a recursive definition of a shortcut path, starting from the entry block.

8. A method for restructuring a computer program according to claim 6 wherein said step of detecting and designating as a shortcut path is extended to include a relative shortcut path defined as a control flow path that proceeds immediately to the exit block or to one other single block of code.

9. A method for restructuring a computer program according to claim 6 further comprising attempting conventional shrink wrapping callee save register references along the identified shortcut control flow paths.

10. A computerized process for modifying a procedure embodied in a computer program stored in a computer memory, the computer program including an entry block of code and an exit block of code, so as to form a modified procedure embodied in a modified computer program stored in the computer memory such that the modified computer program, when executed in a computer, will operate more efficiently than the original program, the process comprising:

designating a predetermined set of hardware registers as callee save registers;

examining control flow of the procedure so as to detect and identify shortcut paths in the control flow;

if any callee save register is referenced along a control flow path other than an identified shortcut path, inserting into the computer program a location for post-dominating the non-shortcut path;

inserting instructions into the computer program for saving callee save register values at a beginning of the non-shortcut path;

inserting instructions into the computer program for restoring the saved register values at the inserted post-dominating location; and routing control flow in the computer program from the inserted post-dominate location to the exit block so as to ensure restoring of callee save register whereby the modified computer program will effect memory access operations to save callee save hardware register values, and to restore the saved hardware register values, less frequently than did the original procedure, thereby reducing procedure call overhead during execution of the modified computer program.

11. A method according to claim 10 wherein the post-dominating location comprises a new exit block of code.

12. A method according to claim 10 wherein said examining control flow of the procedure includes forming a list of related code blocks for each callee save register referenced in the procedure.

13. A method according to claim 11 wherein the list of related code blocks includes, for each callee save register, an indication of all of the corresponding registers' live ranges.

14. A method according to claim 10 further comprising shrink wrapping all callee save register lifetimes for which the list of related code blocks indicates that the register lifetime is confined to a single block of code.

* * * * *